US008511715B2

(12) United States Patent
McCann et al.

(10) Patent No.: US 8,511,715 B2
(45) Date of Patent: Aug. 20, 2013

(54) PIPE CONNECTOR AND METHOD OF CONNECTING PIPES

(75) Inventors: Calum McCann, Gisborne Vic (AU); Glenn McCann, Gisborne Vic (AU)

(73) Assignee: Flowcon Pty Ltd as Trustee for the Flowcon Unit Trust, Gisborne Victoria (AU)

( * ) Notice: Subject to any disclaimer, the term of this patent is extended or adjusted under 35 U.S.C. 154(b) by 214 days.

(21) Appl. No.: 12/602,636

(22) PCT Filed: May 27, 2008

(86) PCT No.: PCT/AU2008/000743
§ 371 (c)(1),
(2), (4) Date: May 5, 2010

(87) PCT Pub. No.: WO2008/144814
PCT Pub. Date: Dec. 4, 2008

(65) Prior Publication Data
US 2010/0213703 A1    Aug. 26, 2010

(30) Foreign Application Priority Data

Jun. 1, 2007  (AU) .............................. 2007902975

(51) Int. Cl.
*F16L 27/00*    (2006.01)
(52) U.S. Cl.
USPC .................................... 285/139.2; 285/139.1
(58) Field of Classification Search
USPC ................... 285/139.1–139.3, 204, 206–210, 285/212, 219–221
See application file for complete search history.

(56) References Cited

U.S. PATENT DOCUMENTS

| 537,031 | A | * | 4/1895 | Gompper | 285/206 |
| 1,355,450 | A | * | 10/1920 | Carlson | 285/209 |

(Continued)

FOREIGN PATENT DOCUMENTS

| FR | 2551834 A | 3/1985 |
| FR | 2 822 921 | 10/2002 |
| FR | 2822921 A | 10/2002 |

OTHER PUBLICATIONS

Case, J.; Chilver, L.; Ross, C.T.F. (1999). Strength of Materials and Structures (4th Edition). p. 12-13. Elsevier.—Online version available at: http://www.knovel.com/web/portal/browse/display?_EXT_KNOVEL_DISPLAY_bookid=496&VerticalID=0 .*

*Primary Examiner* — Aaron Dunwoody
(74) *Attorney, Agent, or Firm* — Knobbe, Martens, Olson & Bear, LLP

(57) ABSTRACT

A pipe connector for providing a fluid connection between two pipe sections. The connector includes a connector housing, the housing including a first fluid flow port, a second fluid flow port and a fluid flow chamber extending between the first and second fluid flow ports. The connector includes a first attachment assembly for attaching the connector to the first pipe section, such that, in use, the first fluid flow port is fluidly connected to an aperture provided in a sidewall of the first pipe section. The connector further includes a second attachment assembly for attaching the connector to the second pipe section, such that, in use, the second fluid flow port is fluidly connected to an open end of the second pipe section. The connector still further includes a seal for, in use, providing a fluid seal between the housing and the first pipe section about the fluid connection between the first fluid flow port and the aperture provided in the sidewall of the first pipe section. The seal has a body extending outwardly from the housing and the body has an outer sealing edge extending generally about the first fluid flow port and is generally outwardly displaced therefrom.

25 Claims, 5 Drawing Sheets

(56) References Cited

U.S. PATENT DOCUMENTS

| | | | | |
|---|---|---|---|---|
| 1,398,083 | A * | 11/1921 | Tibbetts | 285/209 |
| 2,552,686 | A * | 5/1951 | Melcher | 174/153 R |
| 2,897,842 | A * | 8/1959 | Smith | 138/92 |
| 3,190,332 | A * | 6/1965 | Bernard | 383/96 |
| 3,413,019 | A * | 11/1968 | Gerhard | 285/209 |
| 3,749,424 | A * | 7/1973 | Greene | 285/139.1 |
| 3,812,910 | A * | 5/1974 | Wellstein | 166/85.2 |
| 4,042,020 | A * | 8/1977 | Wellstein | 166/85.2 |
| 4,234,218 | A * | 11/1980 | Rogers | 285/149.1 |
| 4,460,519 | A * | 7/1984 | Leggett | 261/76 |
| 4,613,169 | A * | 9/1986 | Engelhart | 285/139.2 |
| 4,735,443 | A * | 4/1988 | Rush et al. | 285/139.1 |
| 4,887,851 | A * | 12/1989 | Rush et al. | 285/139.1 |
| 5,326,139 | A * | 7/1994 | Corcoran | 285/197 |
| 5,456,499 | A * | 10/1995 | Sharpe | 285/39 |
| 5,755,425 | A * | 5/1998 | Marolda | 251/144 |
| 5,974,664 | A | 11/1999 | Stein | |
| 6,102,067 | A * | 8/2000 | Orlando | 137/315.08 |
| 6,517,117 | B1 * | 2/2003 | Lai | 285/202 |
| 6,550,816 | B1 * | 4/2003 | Sorkin | 285/139.1 |
| 6,676,168 | B2 * | 1/2004 | McAliley | 285/206 |
| 6,729,657 | B2 * | 5/2004 | Haymon | 285/139.1 |
| 7,044,623 | B2 * | 5/2006 | Olsson et al. | 362/477 |
| 7,059,638 | B2 * | 6/2006 | Charrette et al. | 285/205 |
| 7,185,490 | B2 * | 3/2007 | Smatloch et al. | 60/323 |
| 7,527,299 | B1 * | 5/2009 | Collier | 285/139.3 |
| 7,597,361 | B2 * | 10/2009 | Theilen | 285/206 |
| 2003/0127853 | A1 * | 7/2003 | Haymon | 285/139.1 |
| 2003/0178843 | A1 | 9/2003 | McAliley | |
| 2004/0046385 | A1 * | 3/2004 | Shemtov | 285/139.1 |
| 2007/0200341 | A1 * | 8/2007 | Veronneau et al. | 285/139.2 |
| 2011/0031740 | A1 * | 2/2011 | Stone | 285/139.2 |

\* cited by examiner

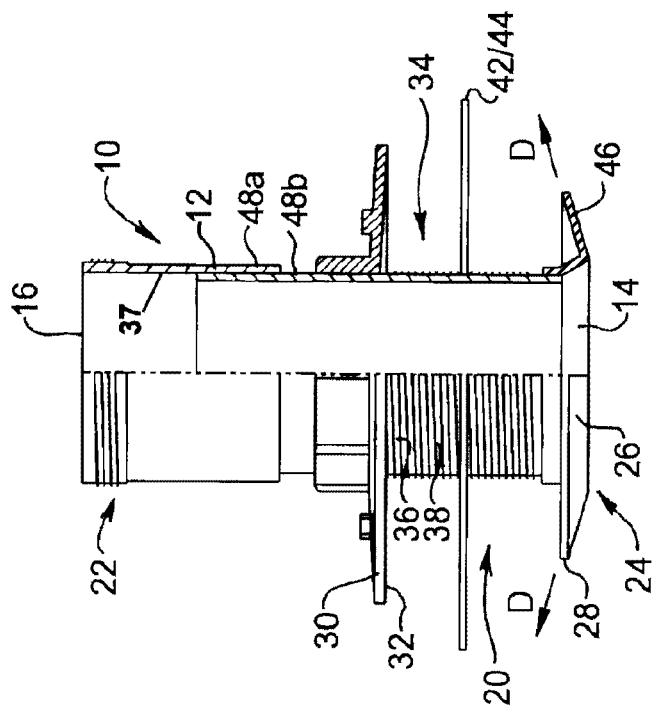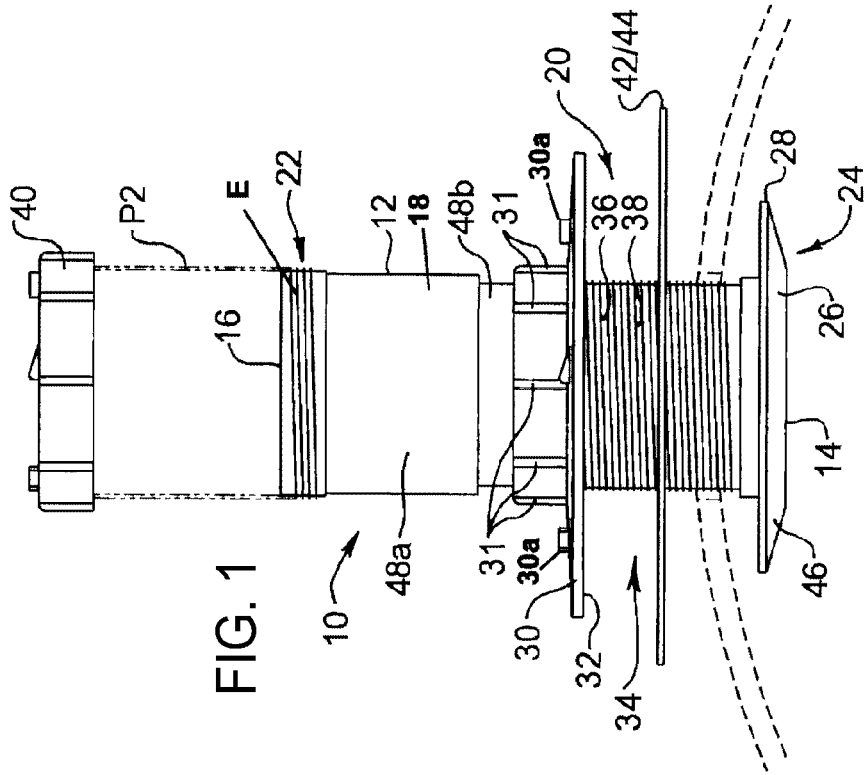

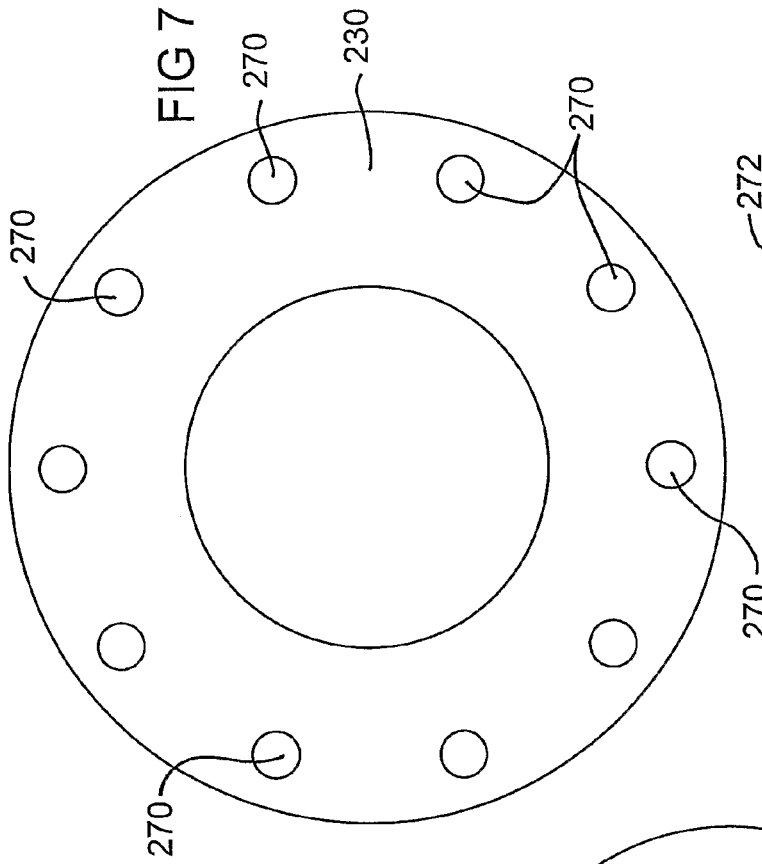
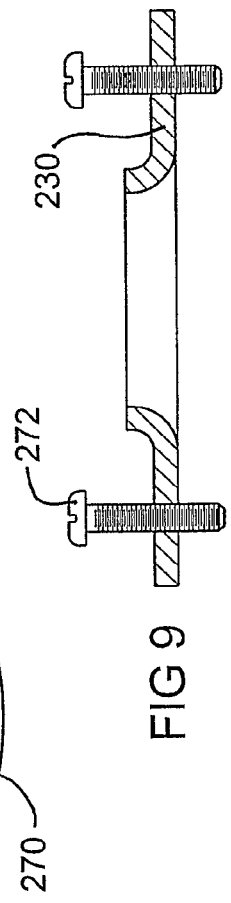
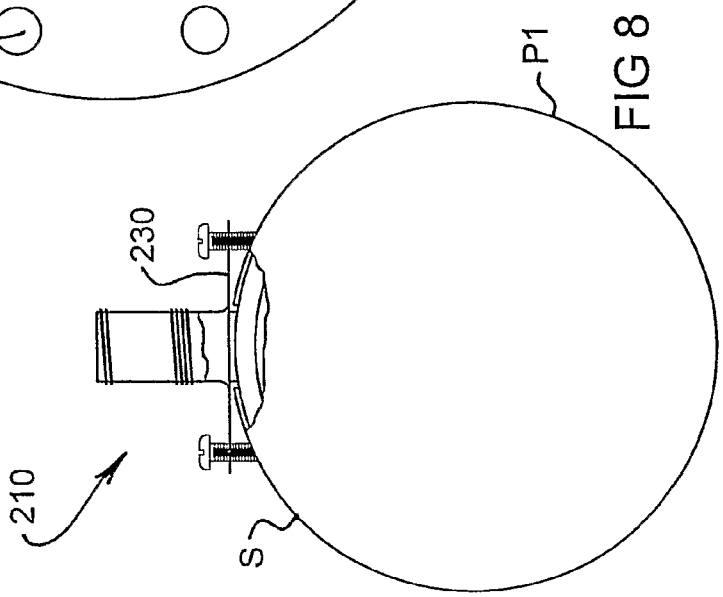

PIPE CONNECTOR AND METHOD OF CONNECTING PIPES

RELATED APPLICATIONS

This application is a U.S. National Phase of International Application No.: PCT/AU2008/000743, filed May 27, 2008, designating the U.S. and published in English on Dec. 4, 2008 as WO 2008/144814, which claims the benefit of Australian Application No. 2007902975, filed Jun. 1, 2007.

The present invention relates broadly to pipes. More particularly, the invention relates to a device and method for connecting pipes together and will herein be described generally in that context. It is to be appreciated, however, that the invention may have other applications.

The applicant is aware of several existing devices and methods for connecting pipes together in an arrangement whereby the end of one pipe (hereinafter called the "connecting pipe") is connected to an opening provided in the sidewall of another pipe (hereinafter called the "receiving pipe").

One method of fitting a connecting pipe to a receiving pipe known to the applicant involves first breaking a hole in the sidewall of the receiving pipe with a hammer or other like implement. Any reinforcing wire remaining in the hole created is then removed using wire cutters or another suitable device. This method is often problematic because the hole produced is usually irregularly shaped, making it difficult to fit and seal the connecting pipe in place using a conventional pipe connector or plug.

Instead of breaking a hole in the receiving pipe with a hammer, the hole may be drilled or cored. While such a method enables a more regularly shaped hole to be produced, overall this method is more expensive, slower and more difficult to undertake. Further this can involve the use of power tools for installation which adds to the complexity and safety risk to the installer, as well as the increased cost in coring a hole.

Existing connectors are often undesirably expensive and are difficult to fit, with special purpose tools often required to fit the connector. Similarly, existing connectors can be difficult and expensive to remove once fitted. Further, these devices are often fitted in such a manner that any exposed metal reinforcing members in the sidewall of the receiving pipe are prone to corrosion from moisture sources internally and/or externally of the pipes.

Some existing arrangements require the connecting pipe to be immobilized in place with cement or mortar, which takes time to set and therefore adds to the overall installation time. It also provides the potential for poorly connected pipes, as the integrity of the resultant connection relies heavily on the skill of the individual(s) connecting the two pipes together.

Even if such pipes are initially satisfactorily connected together the cemented or mortared connection may be compromised if exposed to stress or strain. This can be particularly problematic, with the result being that the connection may be broken altogether, or the connecting pipe may be forced through the hole in the receiving pipe further than desired such that it undesirably inhibits or blocks the flow of fluid through the receiving pipe.

Further, some arrangements require the receiving pipe to be fully unearthed/exposed when connecting the connecting pipe to the receiving pipe, such that the footing or bedding material of the receiving pipe must be disrupted.

Some arrangements include O-rings and other suitable arrangements for providing a fluid seal between the two connected pipes. However, care must be exercised to ensure that these seals are correctly fitted and free from dirt and other matter, otherwise the seal effectiveness can be compromised.

It would be desirable to provide a connector and method for connecting pipes together that at least partially address one or more of the above mentioned limitations inherent in existing connectors and pipe connection methods.

According to one broad aspect of the present invention, there is provided a pipe connector for providing a fluid connection between two pipes sections. The connector includes a connector housing. The housing includes a first fluid flow port, a second fluid flow port and a fluid flow chamber extending between the first and second fluid flow ports. The connector includes a first attachment assembly for attaching the connector to a first pipe section, such that, in use, the first fluid flow port is fluidly connected to an aperture provided in a sidewall of the first pipe section. The housing also includes a second attachment assembly for attaching the connector to a second pipe section, such that, in use, the second fluid flow port is fluidly connected to an open end of the second pipe section. The connector includes a seal for, in use, providing a generally fluid-tight seal between the housing and the first pipe section about the fluid connection between the first fluid flow port and the aperture provided in the sidewall of the first pipe section. The seal includes a body extending outwardly from the housing, and the body includes an outer sealing edge extending generally about the first fluid flow port and generally outwardly displaced therefrom; and wherein The seal body includes a deformable sealing flange extending from the connector housing.

In a preferred form, the sealing edge, in use, extends about the aperture provided in the sidewall of the first pipe section and is outwardly displaced therefrom, in such a manner that it seals against an inner sidewall surface of the first pipe section.

It is to be appreciated that the inner sidewall surface of the first pipe section would typically be curved, and so the seal body is preferably resiliently deformable, so that the body can be deformed such that the sealing edge is able to seal against the inner surface of the sidewall.

Reference within this specification to a pipe section "sidewall" is to be understood in a non-limiting way to refer to any sidewall associated with a pipe section, including but not limited to a sidewall or end wall.

In one form, the first attachment assembly includes a flange mounted to and extending outwardly from the housing, with the flange including a contact surface for contacting an outer surface of the sidewall of the first pipe section. In such an arrangement, a sidewall receiving space is defined, which extends about the housing between the seal body and the flange.

Preferably, the flange is adjustably mounted to the housing for adjusting a clamping force on the sidewall of the first pipe section about the sidewall aperture between the seal body and the flange.

Fastener receiving apertures may be provided about the flange. The fastener receiving apertures may be used for, for example, connecting the flange to the sidewall of the first pipe section in order to provide an enhanced connection between the first pipe section and the connector. This arrangement provides a means for minimizing movement of the connector relative to the first pipe section. In particular, this arrangement provides a means for minimizing movement of the connector relative to the first pipe section in a direction longitudinally along the first pipe section and in a direction tangentially to the longitudinally extending first pipe section, as well as other relative directions. The fastener receiving apertures may be configured for receiving screws, bolts or any other suitable fastener, which may extend through the apertures and engage the sidewall of the first pipe section.

The fastener receiving apertures may be threaded, if desired.

The sealing edge is preferably configured for flaring in an outward direction from the housing upon increasing the clamping force and contact with the inner sidewall surface.

The adjustable mounting may include a threaded connection between the outer surface of the housing and the flange. The adjustable mounting may, however, adopt any other suitable form. These may include, for example, one or more ratchet locking devices comprising teeth which mesh with sliding legs and/or peg-in-hole locking devices and/or spring loaded legs or arms that when opened out keep upward pressure on the connector.

In one form, the second attachment assembly includes a thread provided about the outer surface of the housing that extends at least generally about or proximate the second fluid port. The thread is provided for threadable engagement with a mating internal thread provided within the open end of the second pipe section. The threaded engagement between the connector and the second pipe section is preferably a generally fluid-tight seal. The second attachment assembly may also adopt any other suitable form.

More preferably, the open end of the second pipe section is received within the second fluid port of the connector and retained in this position using adhesive and/or any other suitable means. An internal shoulder may be provided within the second fluid port for accurately locating the open end of the second pipe section within the second fluid port.

A sealing member may be provided about the housing between the seal body and the flange for limiting the ingress of moisture into the aperture from the outside of the first pipe section, such as from rain or other moisture sources. The sealing member may include (but is not necessarily limited to), for example, a rubber sheet extending about the housing between the seal and the flange for, in use, location between the sidewall of the first pipe section and the flange.

The thickness of the seal body may taper outwardly from the housing to the sealing edge, and may extend from the housing generally longitudinally along the housing towards the flange. This assists when deformation of the seal body is necessary, such as during installation when the seal body is inserted through the aperture provided/created in the sidewall of the first pipe section. In this respect it is to be appreciated that the seal body extends outwardly beyond the lip of the aperture and therefore must be deformed to enable insertion through the aperture. It also assists in the deformation of the seal body to enable the sealing edge to come into substantially complete contact with the inner surface of the sidewall of the first pipe section.

In one form, the seal body includes a generally quoit-shaped body section extending outwardly from the housing. A quoit-shaped body may be generally considered to be a flat cone-shaped body having a central aperture. In another form, the seal body includes a generally segment or mound-shaped portion having a void extending therethrough, the segment shaped portion extending outwardly from the housing. Other seal body shapes are of course also possible.

In a preferred form, the thickness of the seal body doesn't taper outwardly from the housing, but instead has an at least substantially uniform thickness. Nevertheless, the thickness of the seal body can taper outwardly if required.

In one preferred form, the seal body does not extend in a direction tangentially outwardly from the housing, but instead extends from the housing in a direction generally longitudinally along the housing towards the flange.

The housing may include a generally tubular section, such as a section of pipe/tube of any suitable dimensions. The cross-sectional shape of the housing may be selected as desired, and may be influenced by the types and/or cross-sectional shapes of the pipe sections to be connected. By way of non-limiting example, the housing may include a generally square or rectangular cross-sectional shape.

The first and second housing ports may each be of any suitable shape and, in one preferred form, are each generally circular.

The present invention has been defined in terms of a connector for connecting two pipe sections. The term "pipe section" is to be understood to refer to a pipe section of any practical length and may refer to an entire length of pipe or only a portion (or section) thereof.

Further, it is to be appreciated that the present invention may be configured for connecting a pipe section to the inlet and/or outlet of, for example, a basin, trough, sink or other item.

The present invention is particularly, but not exclusively configured connecting between a first pipe section of a larger diameter to a second pipe section of a smaller diameter. However, the connector may be configured for connecting a first pipe section to a second pipe section of a similar or larger diameter. This may require the provision of housing fluid flow ports of differing sizes.

The present invention, in another broad aspect, is directed to a template for assistance in creating an aperture in a sidewall of a section of pipe prior to connection of a connector thereto. In this respect, the present invention is also directed to a template for use in creating an aperture in the sidewall of a pipe, the template defining an aperture size tolerance between a maximum permissible aperture size and a minimum permissible aperture size.

The template provides a tolerance because, unlike existing arrangements, the connector of the present invention will connect to the first pipe section in a generally fluid-tight manner even if the aperture in the pipe is not accurately drilled or cut. In other words the unique design of the connector of the present invention allows for a generally fluid-tight connection between the connector and the first pipe section even if irregularities or irregular shapes are introduced (within practical limits) when creating the aperture in the first pipe section.

In another aspect, the present invention is directed to a method of connecting two sections of pipe. The method includes fluidly connecting a first fluid flow port of a pipe connector to an aperture provided in a sidewall of a first pipe section using a first attachment assembly. This includes inserting a body of a seal attached to a connector housing, and including a deformable sealing flange extending from the connector housing, through an aperture provided in a sidewall of the first pipe section. It also includes adjusting the position of a flange adjustably mounted to the housing relative to the housing to clamp the sidewall between the seal body contacting an inner sidewall surface of the first pipe section and the flange adjusted to contact an outer sidewall surface of the first pipe section, in order to attach the connector to the first pipe section and create a generally fluid seal between the aperture and the first fluid flow port provided in the connector housing. The method also includes fluidly connecting the connector to a second pipe section using a second attachment assembly to provide a generally fluid connection between an open end of the second pipe section and a second port provided in the connector housing.

In a preferred from, where an aperture does not already exist in the sidewall of the first pipe section, the method also includes the initial steps of locating a template on an outer sidewall of the first pipe section, the template defining an aperture size tolerance between a maximum preferred aperture size and a minimum preferred aperture size; and creating the aperture in the sidewall of the first pipe section by hammering and/or cutting and/or drilling and/or coring the sidewall of the first pipe section overlaid with the template.

The step of creating a generally fluid-tight seal between the aperture and the first fluid flow port provided in the connector housing preferably includes sealing the sealing edge about the aperture against an inner sidewall surface of the first pipe section. This preferably involves deforming the sealing body to the inner surface of the sidewall.

The invention has, so far, been described in the context of a device and method for connecting two pipe sections. However, the invention may be configured for connecting together any practical number of pipe sections. An additional housing port(s) may be required.

It is to be appreciated that the connector may be integrated with one of the pipe sections. For example, the connector may be integrated with the second pipe section.

Reference has been made so far to the connector being for creating a generally fluid-tight connection between two pipe sections. However, it should be appreciated that the connector may have non-fluid flow or gas flow applications, including applications involving the flow of granular and/or particulate matter.

It will be convenient to hereinafter describe preferred embodiments of the invention with reference to the accompanying drawings. The particularity of the drawings is to be understood as not limiting the broad description of the invention.

FIG. 1 is a side view of a connector according to one embodiment of the present invention.

FIG. 2 is a partially sectional side view of the connector illustrated in FIG. 1.

FIG. 7 is an end view of a flange for use with a connector according to another embodiment of the present invention.

FIG. 8 is a side view of the connector illustrated in FIG. 7 when fitted in position to a pipe section and extending through an aperture provided in the sidewall of the pipe section.

FIG. 9 is a magnified side view of a portion of FIG. 8.

Figure 3:
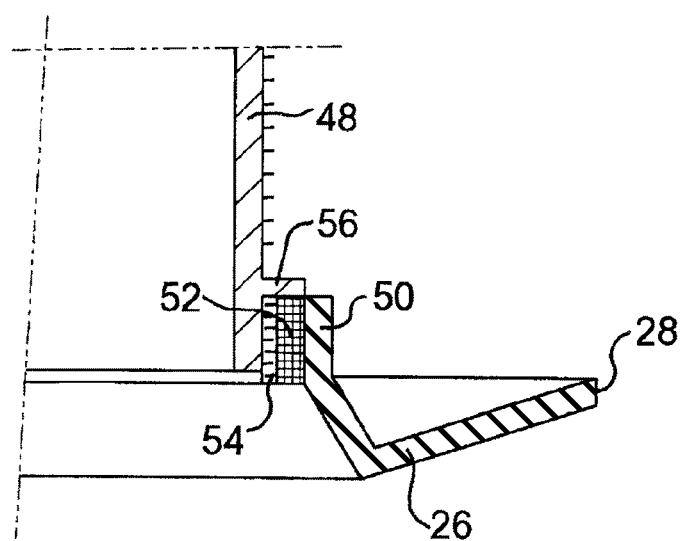
FIG. 3 is a magnified view of a portion of the connector illustrated in FIG. 1.

Referring to the FIGS. 1 and 2, there is illustrated a pipe connector 10 for providing a fluid connection between two pipes sections, the position of which are very generally indicated in dashed line format as P1 and P2. The connector 10 includes a connector housing 12. The housing 12 includes a generally circular first fluid flow port 14, a generally circular second fluid flow port 16 and a fluid flow chamber 18 extending between the first and second fluid flow ports 14,16.

The port 14 may have a curved profile so as to contour similarly to the inner surface of the pipe section P1.

The connector 10 includes a first attachment assembly 20 for attaching the connector 10 to the first pipe section (or receiving pipe section) P1, such that, in use, the first fluid flow port 14 is fluidly connected to an aperture A provided in a sidewall S of the first pipe section P1.

The housing 12 also includes a second attachment assembly 22 for attaching the connector 10 to the second pipe section (or connecting pipe section) P2, such that, in use, the second fluid flow port 16 is fluidly connected to an open end E of the second pipe section P2. The connector 10 includes a seal 24 for, in use, providing a generally fluid-tight seal between the housing 10 and the first pipe section P1 about the fluid connection between the first fluid flow port 14 and the aperture A provided in the sidewall S of the first pipe section P1. The seal 24 includes a body 26 of substantially constant cross-sectional thickness extending outwardly from the housing 10, and the body 26 includes an outer sealing edge 28 extending generally about the first fluid flow port 14 and generally outwardly displaced therefrom. It is to be appreciated that the seal body 26 does not extend in a direction tangentially outwardly from the housing 12, but instead extends outwardly from the housing 12 in a direction generally longitudinally back along the housing 12 in the direction D (see FIG. 2).

It is to be appreciated that the seal 24 may be replaced with any other suitable sealing arrangement including but not limited to injected sealants, foams and O-rings.

It is to be appreciated that, in use, the sealing edge 28 extends about the aperture A provided in the sidewall S of the first pipe section P1 and is outwardly displaced therefrom, in such a manner that it seals against an inner sidewall surface of the first pipe section P1.

The seal body 26 is manufactured from resiliently deformable rubber (or other suitable material), so that the body 26 deforms to enable the sealing edge 28 to seal against the curved inner surface of the sidewall. When clamping the sealing edge 28 against the inner sidewall surface S, the sealing edge 28 flares slightly in an outward direction and increases the sealing force between the sealing edge 28 and the inner surface of the sidewall S.

The seal body 26 is illustrated as being generally circular. However the seal body 26 may be of any other suitable shape. The shape may be selected to suit the shape of the hole for use therewith. Indeed, it may be desirable for the seal body 26 to be oval in shape.

The first attachment assembly 20 includes a flange 30 mounted to and extending outwardly from the housing 12, with the flange 30 including a contact surface 32 for contacting an outer surface of the sidewall S of the first pipe section P1. In such an arrangement, a sidewall receiving space 34 is defined, which extends about the housing 12 between the seal body 26 and the flange 30.

The flange 30 is adjustably mounted to the housing 12 for adjusting a clamping force on the sidewall S of the first pipe section P1 (about the sidewall aperture A) between the seal body 26 and the flange 30.

The flange 30 may have a curved profile similar to that of the outer surface of pipe section P1, although this is optional.

The adjustable mounting includes a threaded connection 36 between the outer surface of the housing 12 and the flange 30. It is to be appreciated however, that the adjustable mounting may adopt any other suitable form, non-limiting examples of which have been previously mentioned.

Lugs 31 are provided about the flange 30 to assist in manually tightening (or indeed loosening) of the flange 30.

The second attachment assembly 22 includes a suitably sized and shaped second fluid port 16 for receiving the open end of the second pipe section P2 therein. The second fluid port 16 includes an internal shoulder 37, against which the open end of the second pipe section P2 abuts when installed. The internal shoulder 37 also limits insertion of the second pipe section P2 into the housing 12 during installation. The end of the second pipe section P2 is retained within the second fluid port 16 using an appropriate adhesive (or glue) between the outer surface of the end of the second pipe section P2 and the inner surface of the second fluid port 16. Any other suitable means for retaining the end of the second pipe section P2 within the second fluid port 16 may be used in place of or in conjunction with adhesive. The engagement between the connector 10 and the second pipe section P2 provides a generally fluid-tight seal. It is to be appreciated that the second attachment assembly 22 may adopt any other suitable form to that illustrated.

The internal shoulder 37 may be replaced by any suitable arrangement. For example, the open end of the second pipe section P2 may be screwed, clipped, welded or fused to the second fluid port 16. Such an arrangement may be used in conjunction with or instead of adhesive.

A thread 38 is provided about the outer surface of the housing 12, which extends about the second fluid port 16. The thread 38 may be provided for threadable engagement with a mating internal thread provided on the second pipe section P2 within the open end of the second pipe section P2. More preferably, however, the thread 38 is provided for threadably connecting a sealing end cap 40 in place of a second pipe section P2, with the end cap 40 provided with a mating internal thread (not illustrated).

It is to be appreciated that the thread 38 need not be provided.

As previously stated, the connector may be integrated with one of the pipe sections. For example, the connector may be integrated with the second pipe section P2. This may be of benefit in some applications, as it may simplify the installation process and reduce the time that an installer may need to spend in a trench or other confined or otherwise difficult workspace. Also, it may mean that the installer need not actually enter the trench, but rather is potentially able to install the connector (and second pipe section), from outside the trench with use of a designated tool designed to fit with the connecting pipe.

A sealing member 42 is provided about the housing 12 between the seal body 26 and the flange 30 for limiting the ingress of moisture into the aperture A from the outside of the first pipe section P1, such as from rain or other moisture sources. The sealing member may be of any suitable form, and in the illustrated embodiment includes a rubber sheet 44 extending about the housing 12 between the seal 24 and the flange 30 for, in use, location between the sidewall S of the first pipe section P1 and the flange 30.

The flange 30 includes two or more threaded apertures 30a for optionally receiving threaded fasteners (not illustrated). The threaded fasteners may abut against rubber sheet 44 to tension the seal 24 against the inner surface of the first pipe section P1 and retain the rubber sheet 44 in contact with the outer surface of the first pipe section P1.

Alternatively, any other suitable arrangement may be used to tension the seal 24 against the inner surface of the first pipe section P1, and to retain the rubber the rubber sheet 44 against the outer surface of the first pipe section P1. For example, suitably shaped wedges may be inserted between the rubber sheet 44 and surface 32.

Alternatively, the sheet 44 could be moulded or otherwise curved into the shape of the outer surface of P1. In such an arrangement the sheet 44 may include an internally threaded central bore for threadably engaging with the threaded connection 36. Thus, the sheet 44 need not be a planar shape.

Still alternatively, a ratchet type system acting between the sheet 44 (or equivalent) and the outer surface of the housing 12 may be used to seal the seal 24 against the inner surface of the section P1, and secure the sheet 44 (or equivalent) in place.

Indeed, any of the above methods of securing the seal 24 and the sheet 44 (or equivalent thereof) in place may be used in combination, if desired.

It may in fact be desirable to manufacture the sheet 44 (or equivalent) in a desired curved profile.

The seal body 26 extends in a non-tangential direction D (the direction D may differ from that illustrated) outwardly from the housing 12 to the sealing edge 28. This assists when deformation of the seal body 26 is necessary, such as during installation when the seal body 26 is inserted through the aperture A provided/created in the sidewall S of the first pipe section P1. In this respect, it is to be appreciated that the seal body 26 extends outwardly beyond the lip L of the aperture A and therefore must be deformed to enable insertion through the aperture A. It also assists in deformation of the seal body 26 to enable the sealing edge 28 to come into substantially complete contact with the inner surface of the sidewall S of the first pipe section P1.

The seal body 26 includes a generally quoit-shaped body section 46 extending outwardly from the housing 12. By quoit-shaped, it is to be understood that the seal body 26 has a generally very flat cone-shaped body having a central aperture. Other seal body shapes are also possible, such as that illustrated in FIGS. 5 and 6. These other seal body shapes may have substantially constant cross-sectional thicknesses or may have thicknesses that taper generally outwardly from the housing 12.

The housing 12 includes a generally tubular PVC pipe sections 48a,b securely mounted together. However, it is to be appreciated that the pipe sections 48a,b may be manufactured from any suitable material. Although not illustrated, sections 48a,b are preferably manufactured in a single piece, as the outer shoulder between these two pieces is of no practical use. Further, the cross-sectional shape of the housing 12 may be selected as desired (including, for example, square or rectangular) and may be influenced by the types and/or cross-sectional shapes of the pipe sections to be connected.

While the illustrated first and second housing ports 14,16 are generally circular, they may be of any other suitable shape, and arranged at any suitable angle to each other.

The housing 12 may be manufactured from any suitable material, including (but not limited to) iron, ductile iron, steel, black steel, stainless steel, copper, aluminium, brass, zincalum, cast iron, polyvinyl chloride (PVC), polybutylene, polyethylene, black polythene, pigmented or filled relatively rigid plastic, UPVC, fibre reinforced cement and polybutylene. Preferably, PVC is used, and the housing 12 is made in one piece, although other forms are of course possible.

The seal 24 may also be manufactured from any suitable material, including (but not limited to) a resilient deformable material such as natural or synthetic rubber, latex, neoprene, nitrile, butyl rubber, SBR rubber, flexible polyurethane, BTR rubber.

The present invention has been defined in terms of a connector 10 for connecting two pipe sections P1 and P2. As previously stated, the term "pipe section" is to be understood to refer to a pipe section of any practical length and may refer to an entire length of pipe or only a portion (or section) thereof.

Further, it is to be appreciated that the present invention may be configured for connecting a pipe section to the inlet and/or outlet of, for example, a basin, trough, sink or other item.

The present invention is particularly, but not exclusively configured connecting between a first pipe section P1 of a larger diameter to a second pipe section P2 of a smaller diameter. However, the connector 10 may be configured for connecting a first pipe section P1 to a second pipe section P2 of a similar or larger diameter. This may require the provision of housing fluid flow ports 14,16 of differing sizes to that illustrated.

FIG. 3 illustrates one method of mounting the seal 24 about the end of the pipe section 48b, which involves a hot melt stick process between a seal collar 50 and an internally threaded collar 52, which is threaded to the housing 10 about the end 54 of the pipe section 48b. An end stop 56 is provided about the pipe section 48 for limiting the extent of threaded engagement of the collar 52 on the pipe section 48b. It is to be appreciated, however, that a more preferred method of mounting the seal 26 to the end of the pipe section 48b may be by way of a clamp, buckle, strap and/or adhesive.

The connector 10 would typically be sold with the seal 24 already fitted to the pipe sections 48b. Alternatively, the seal 24 and pipe sections 48a,b may be sold separately to allow the purchaser to purchase and fit a seal of a required size to a pipe section of a required size for a specific application, which may be dependent at least in part upon the size of the pipes to be connected.

Figure 4:
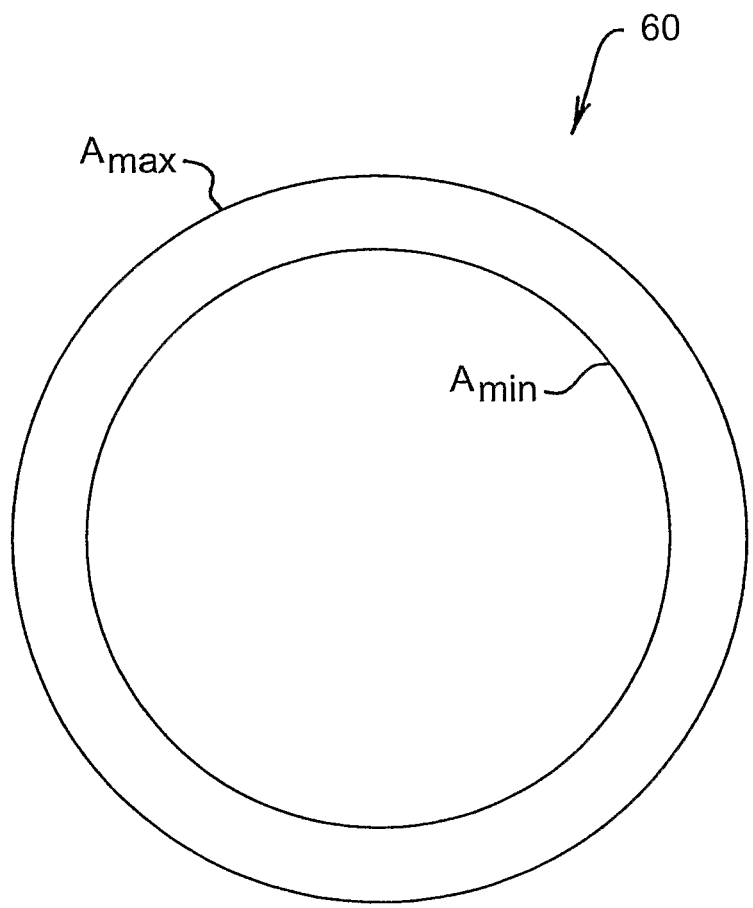
FIG. 4 illustrates a template for use in creating an aperture in a sidewall of a pipe section.

FIG. 4 illustrates a planar ring-shaped template 60 for creating the aperture A in the sidewall S of the pipe section P1 prior to connecting of the connector 10 thereto. The template 60 defines an aperture size tolerance between a maximum permissible aperture size $A_{max}$ and a minimum permissible aperture size $A_{min}$. The template 60 is attached to the sidewall S at a desired location, following which the aperture A is created by hammering and/or drilling and/or cutting and/or other suitable means to create the aperture having a lip that preferably falls at all points within the tolerance range between identified by the maximum permissible aperture size $A_{max}$ and the minimum permissible aperture size $A_{min}$. The template 60 is not drawn to scale. Moreover, the difference between the maximum permissible aperture size $A_{max}$ and the minimum permissible aperture size $A_{min}$ may be different to that indicated.

The template 60 may be manufactured in any suitable size and shape, and from any suitable material and may include an adhesive for attaching the template 60 to the sidewall surface. The template may alternatively take the form of a stencil or other type of indicator. Whatever form is used, preferably it is able to be deformed to the curved outer surface of a pipe.

The template 60 provides a tolerance because, unlike existing arrangements, the connector 10 of the present invention will connect to the first pipe section P1 in a generally fluid-tight manner even if the aperture A in the pipe is not accurately drilled or cut. In other words the unique design of the connector 10 of the present invention allows for a generally fluid-tight connection between the connector 10 and the first pipe section P1 even if shape irregularities are introduced (within practical limits) when hammering and/or drilling and/or cutting of the aperture in the first pipe section P1.

Figure 5:
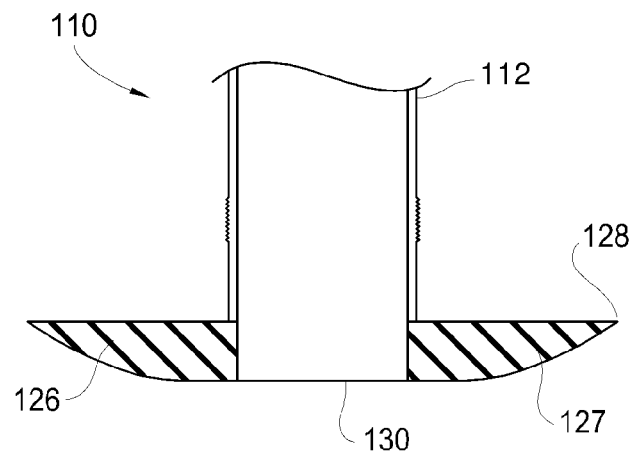
FIG. 5 is a side view of a connector according to another embodiment of the present invention.
Figure 6:
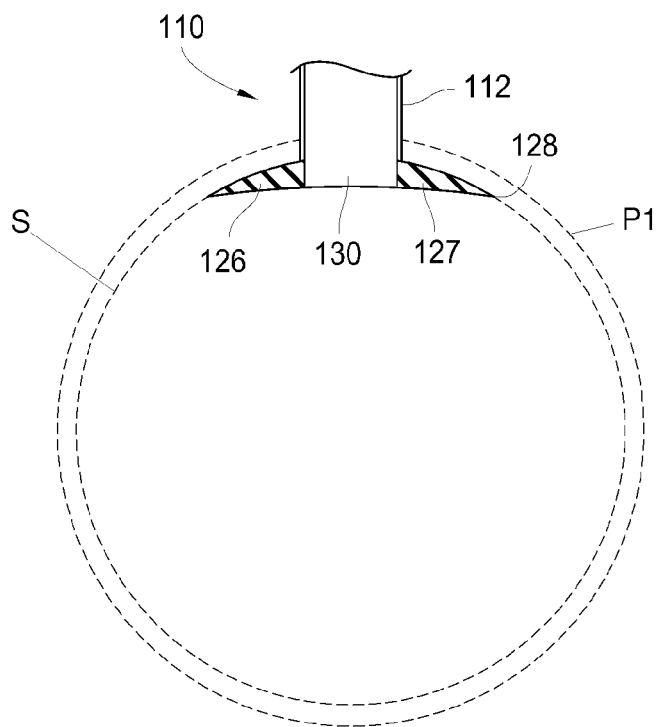
FIG. 6 is a side view of a portion of the connector illustrated in FIG. 5 when fitted in position to a pipe section and extending through an aperture provided in the sidewall of the pipe section.

Another possible connector configuration is illustrated in FIGS. 5 and 6. The connector 110 includes many similarities to the connector 10 illustrated in FIGS. 1, 2 and 3. One notable difference is the shape of the seal body 126 when compared to the seal body 26 illustrated in FIGS. 1, 2 and 3. The seal body 126 includes a generally segment or mound shaped portion 127 having a void 130 extending therethrough, the segment shaped portion 127 extending outwardly from the housing 112. Again other seal body shapes are also possible.

FIG. 6 clearly illustrates how the seal body 126 deforms to the inner surface of the sidewall S to create a fluid seal when the connector 110 is clamped to the sidewall S.

FIGS. 7 to 9 illustrates and alternative embodiment of a flange 230 for use with a connector 210. One significant difference between the flange 230 and the flange 30 illustrated in FIGS. 1 and 2 is that the flange 230 includes fastener receiving apertures 270 provided about the flange 230. The fastener receiving apertures 270 are for connecting the flange 230 to the sidewall S of the first pipe section P1 using screw threaded fasteners 272. This provides an enhanced connection between the first pipe section P1 and the connector 210, which minimizes movement of the connector 210 relative to the first pipe section P1. In particular, this arrangement provides a means for minimizing movement of the connector 210 relative to the first pipe section P1 in a direction longitudinally along the first pipe section P1 and in a direction tangentially to the longitudinally extending first pipe section P1, as well as other relative directions. It is to be appreciated that the fastener receiving apertures 270 may be configured for receiving screws, bolts or any other suitable fastener, which may extend through the apertures 270 and engage the sidewall S of the first pipe section P1.

Referring to FIGS. 1, 2 and 3, fitment of the connector 10 in place between pipes P1 and P2 is as follows. Where a suitable aperture does not already exist in the sidewall S of the first pipe section P1, the template 60 is located at a suitable position on an outer sidewall of the first pipe section P1. An installer then creates the aperture A in the sidewall S of first pipe section P1 by hammering and/or cutting and/or drilling the sidewall S overlaid with the template 60. Reinforcing wire may need to be removed from within the sidewall aperture A using a suitable tools(s).

Following this, the first fluid flow port 14 of the connector 10 is fluidly connected to the sidewall aperture A of the first pipe section P1 using the first attachment assembly 20. In this respect, the seal body 26 is inserted through the aperture A such that the remainder of the connector 10 extends outwardly from the aperture A. The flange 30 is then rotated about the housing 12 via its threaded attachment in order to clamp the sidewall S between the seal body 26 (contacting an inner sidewall surface of the first pipe section P1) and the flange 30 (adjusted to contact an outer sidewall surface of the first pipe section P1). This action connects the connector 10 to the first pipe section P1, and creates a generally fluid-tight seal between the aperture A and the first port 14, as it deforms and seals the sealing edge 30 against the inner sidewall surface of the first pipe section P1 about the aperture A.

Thereupon, the connector 10 is connected to the second pipe section P2 using the second attachment assembly 22 to provide a generally fluid connection between the open end of the second pipe section P2 and the second port 16 provided in the connector housing 12. In this respect, the second attachment assembly 22 includes a suitably sized and shaped second fluid port 16 for receiving the open end of the second pipe section P2 therein. The second fluid port 16 includes an internal shoulder 37, against which the open end of the second pipe section P2 abuts when installed. The end of the second pipe section P2 is retained within the second fluid port 16 using an appropriate adhesive (or glue) between the outer surface of the end of the second pipe section P2 and the inner surface of the second fluid port 16. It is to be appreciated that the second attachment assembly 22 may adopt any other suitable form to that illustrated.

The present invention has a wide variety of potential applications, including residential, commercial, industrial and retail applications.

Advantageously, the present invention allows for a generally fluid-tight connection to be created even where an imperfectly created or irregular aperture A is provided in the sidewall S of a pipe section P1. This is because the seal body 26/126/226 has been designed such that it extends outwardly beyond the lip of the aperture A. Thus, within practical limits, the sealing edge 28/128/228 of the seal body 26/126/226 is advantageously able to sealingly contact the inner sidewall surface even if the aperture is slightly larger (or smaller) than intended or irregularly shaped.

Thus, it is to be appreciated that use of the connector 10/110/210 need not require the time, expense, technical expertise and associated safety risks involved with some existing connectors in having to accurately drill or core the sidewall aperture.

Advantageously, the connector 10/110/210 is economical to produce and relatively simple to fit, and does not require special purpose tools when fitting. Further, unlike many exiting connectors, the connector 10/110/210 can be relatively easily removed once fitted. Also, the connector addresses the very real problem of preventing moisture access to the metal reinforcement exposed at the aperture lip, which would otherwise corrode and adversely affect the integrity of a concrete pipe(s). It also addresses the potential problem of the connecting pipe blocking the flow within the receiving pipe.

The present invention desirably avoids the need for the pipes to be immobilized in place with cement or mortar, therefore minimizing the overall installation time. It also lessens the likelihood of pipes being poorly connected together, as the integrity of the resultant connection relies less on the skill of the individual(s) connecting the two pipes together when compared existing arrangements.

As the present invention does not require the use of cement or mortar, its integrity is less affected if exposed to stress or strain when compared to existing arrangements.

Further, the present invention advantageously does not require the receiving pipe to be fully unearthed/exposed when connecting the connecting pipe to the receiving pipe, such that the footing or bedding material of the receiving pipe need not be disrupted.

Further, the present invention obviates the need for conventional O-rings and other suitable arrangements for providing a generally fluid-tight seal between the two connected pipes and therefore avoids the potential problems associated therewith.

It is to be understood that various alterations, modifications and/or additions may be introduced into the product and/or method previously described without departing from the spirit or ambit of the invention

The invention claimed is:

1. A pipe connector for providing a fluid connection between two pipe sections, the connector including:
   a connector housing;
   the housing including a first fluid flow port, a second fluid flow port and a fluid flow chamber extending between the first and second fluid flow ports;
   a first attachment that attaches the connector to a first pipe section, such that the first fluid flow port is fluidly connected to an aperture provided in a sidewall of the first pipe section;
   a second attachment that attaches the connector to a second pipe section, such that the second fluid flow port is fluidly connected to an open end of the second pipe section; and
   a seal that provides a fluid seal between the housing and the first pipe section about the fluid connection between the first fluid flow port and the aperture provided in the sidewall of the first pipe section, the seal extending continuously about the aperture with a substantially uniform shape; the seal having a body extending outwardly from the housing and the body having an outer sealing edge extending generally about the first fluid flow port and generally outwardly displaced therefrom; and wherein the seal body comprises a resiliently deformable sealing flange extending from the connector housing, wherein the seal and connector body are configured to be inserted through the aperture provided in the sidewall of the first pipe section in a direction from an outer side of the first pipe section to an inner side of the first pipe section during installation of the pipe section, and wherein the outer sealing edge is resiliently deformable against an inner sidewall surface of the first pipe section to create a seal with the inner side of the first pipe section.

2. A connector according to claim 1, wherein the sealing edge extends about the aperture provided in the sidewall of the first pipe section and is outwardly displaced therefrom.

3. A connector according to claim 1, wherein the sealing edge seals against an inner sidewall surface of the first pipe section.

4. A connector according to claim 1, wherein the seal body is resiliently deformable.

5. A connector according to claim 1, wherein the first attachment assembly includes a flange mounted to and extending outwardly from the housing.

6. A connector according to claim 5, wherein the flange comprises a contact surface for contacting an outer surface of the sidewall of the first pipe section.

7. A connector according to claim 5 comprising a sidewall receiving space extending about the housing between the seal body and the flange.

8. A connector according to claim 5, wherein the flange is adjustably mounted to the housing for adjusting a clamping force of the sidewall of the first pipe section between the seal body and the flange; and the sealing edge is configured for expansion or flaring in an outward direction from the housing upon increasing the clamping force; and the adjustable mounting comprises a threaded connection between the outer surface of the housing and the flange.

9. A connector according to claim 5 comprising a sealing member provided about the housing between the seal body and the flange.

10. A connector according to claim 9, wherein the sealing member comprises a rubber sheet extending about the housing between the seal and the flange for location between the sidewall of the first pipe section and the flange.

11. A connector according to claim 5, wherein the flange comprises fastener receiving apertures for fastening the flange to the sidewall of the first pipe section.

12. A connector according to claim 1, wherein the second attachment assembly comprises a receiving shoulder provided about or within the second fluid port for abutting an open end of the second pipe section.

13. A connector according to claim 12, wherein the second pipe section is retained in position using adhesive or glue.

14. A connector according to claim 1, wherein the thickness of the seal body is of substantially uniform thickness.

15. A connector according to claim 1, wherein the thickness of the seal body tapers outwardly from the housing.

16. A connector according to claim 15, wherein the seal body comprises a generally quoit-shaped body section or a body section comprising a generally flat cone-shape with a central aperture, extending outwardly from the housing.

17. A connector according to claim 15, wherein the seal body comprises a generally segment or mound shaped portion having a void extending therethrough, the segment shaped portion extending outwardly from the housing.

18. A connector according to claim 1, wherein the housing comprises a generally tubular, square or rectangular section.

19. A connector according to claim 18, wherein the generally tubular, square or rectangular section includes a pipe or downpipe section.

20. A connector according to claim 1, when configured for connecting to at least one pipe section or downpipe section having a circular, square or rectangular cross-sectional shape.

21. A connector according to claim 1, wherein at least one of the first and second ports are generally circular.

22. The pipe connector according to claim 1, wherein the resiliently deformable sealing flange is manufactured from a material selected from the group consisting of natural rubber, synthetic rubber, latex, neoprene, nitrile, butyl rubber, styrene-butadiene rubber (SBR), flexible polyurethane and butyl rubber (BTR).

23. A method of connecting two pipe sections, the method comprising:
fluidly connecting a first fluid flow port of a pipe connector to an aperture provided in a sidewall of a first pipe section using a first attachment assembly;
inserting a seal body attached to the connector housing, and comprising a resiliently deformable sealing flange extending from the connector housing, through an aperture provided in a sidewall of the first pipe section from the outside of the first pipe section to the inside thereof by deforming the resiliently deformable sealing flange;
adjusting the position of a sealing member adjustably mounted to the housing relative to the housing to clamp the sidewall between the seal body contacting an inner sidewall surface of the first pipe section and the sealing member adjusted to contact an outer sidewall surface of the first pipe section, so as to deform the resiliently deformable sealing flange against the inner sidewall surface and form a seal, and to attach the connector to the first pipe section and create a fluid seal between the aperture and a first port provided in a connector housing, such that the seal body extends continuously about the aperture with a substantially uniform shape; and
fluidly connecting the connector to a second pipe section using a second attachment assembly to provide a generally fluid-tight connection between an open end of the second pipe section and a second port provided in the connector housing.

24. A method according to claim 23, comprising the initial steps of:
locating a template on an outer sidewall of the first pipe, the template defining an aperture size tolerance between a maximum preferred aperture size and a minimum preferred aperture size, and
creating the aperture in the sidewall of first pipe section by hammering, cutting, drilling, or coring the sidewall of the first pipe section overlaid with the template.

25. A method according to claim 23, wherein the step of creating a fluid seal between the aperture and the first port provided in a connector housing comprises sealing the sealing edge about the aperture against an inner sidewall surface of the first pipe section; and the step of clamping comprises deforming the sealing body to conform to the inner surface of the sidewall.

\* \* \* \* \*